US005988996A

United States Patent [19]
Brookbank et al.

[11] Patent Number: 5,988,996
[45] Date of Patent: Nov. 23, 1999

[54] ELECTRICAL SHAFT GROUNDING BRUSH ASSEMBLY AND HOLDER FOR A SUBMERSIBLE PUMP MOTOR

[75] Inventors: Earl Bruce Brookbank, Claremore; Larry J. Parmeter, Bartlesville, both of Okla.

[73] Assignee: Baker Hughes Incorporated, Houston, Tex.

[21] Appl. No.: 08/964,549

[22] Filed: Nov. 5, 1997

[51] Int. Cl.[6] ............................... F04B 35/04; H05F 3/00
[52] U.S. Cl. ..................... 417/423.3; 361/221; 310/239
[58] Field of Search ............... 417/423.3, 424.2, 417/423.7, 423.5, 423.12; 310/248, 239, 71; 361/221

[56] References Cited

U.S. PATENT DOCUMENTS

| | | | |
|---|---|---|---|
| 2,315,917 | 4/1943 | Arutunoff | 172/36 |
| 3,671,786 | 6/1972 | Jones | 310/87 |
| 3,975,117 | 8/1976 | Carter | 417/370 |
| 4,049,343 | 9/1977 | Hermanson | 355/3 P |
| 4,453,892 | 6/1984 | Brookbank, III | 417/279 |
| 4,544,215 | 10/1985 | Fritsch | 339/5 |
| 4,673,837 | 6/1987 | Gingerich et al. | 310/239 |
| 4,771,360 | 9/1988 | Ayash | 361/221 |
| 5,227,950 | 7/1993 | Twerdochlib | 361/221 |
| 5,233,499 | 8/1993 | Twerdochlib | 361/212 |
| 5,345,132 | 9/1994 | Sasaki et al. | 310/239 |
| 5,530,309 | 6/1996 | Weldon | 310/178 |

*Primary Examiner*—Charles G. Freay
*Assistant Examiner*—Robert Z. Evora
*Attorney, Agent, or Firm*—James E. Bradley

[57] ABSTRACT

An electrical motor for a submersible well pump assembly has a brush for preventing arcing across the bearings. The motor has a housing and a stator stationarily mounted in the housing. A shaft extends through a cavity in the stator, the shaft carrying a rotor. Bearings are located at the base and head of the pump for stabilizing the shaft in the housing. A brush is stationarily carried by the housing in electrical common with the stator in the housing. The brush is also in sliding engagement with the shaft. The brush is located near one of the ends of the housing to reduce arcing across the bearing because of voltage differential between the shaft and the stator.

31 Claims, 2 Drawing Sheets

5,988,996

ELECTRICAL SHAFT GROUNDING BRUSH ASSEMBLY AND HOLDER FOR A SUBMERSIBLE PUMP MOTOR

TECHNICAL FIELD

This invention relates in general to electrical submersible pump motors, and in particular to a brush assembly for reducing arcing across bearings between a rotor shaft and stator.

BACKGROUND ART

Electrical submersible pumps are used for high volume well production. A submersible pump assembly of this type has a centrifugal pump with a large number of stages. The pump is driven by an electrical motor located below the pump and protected by a seal section which contains thrust bearings for pump thrust. The electrical motor is an AC motor supplied with power from the surface through a cable. The entire assembly is mounted on tubing within a cased well.

The motor is typically 30 feet or more. A rotor mounted to a shaft rotates within a stationary stator to drive the pump. A number of radial bearings are located along the length of the motor for radially stabilizing the rotor. A thrust bearing for rotatably supporting the weight of the rotor is located at the top or head of the motor. In tandem motor assemblies, a thrust bearing is located at the head of the lower motor. The motor is filled with a dielectric lubricant.

Because of the high electrical power supplied to the stator, a magnetic field is generated which causes voltage to be induced into the shaft. At times, the voltage buildup can create a differential between the shaft and the stator or housing that is sufficiently high to cause an electrical arc between the rotating and nonrotating components of the bearings.

DISCLOSURE OF INVENTION

In this invention, a brush is located within the housing of the motor to prevent arcing across the bearings. The brush assembly is in sliding engagement with the shaft and in electrical common with a stationary portion of the motor.

In the embodiments shown, the brush assembly includes a holder to which a wire brush is mounted. The holder is slidably carried within a bracket which mounts to a stationary portion of the motor. A spring urges the holder and brush into contact with the motor. The bracket and holder place the brush in electrical common with a stationary part of the motor housing.

BEST MODE OF CARRYING OUT THE INVENTION

Figure 1:
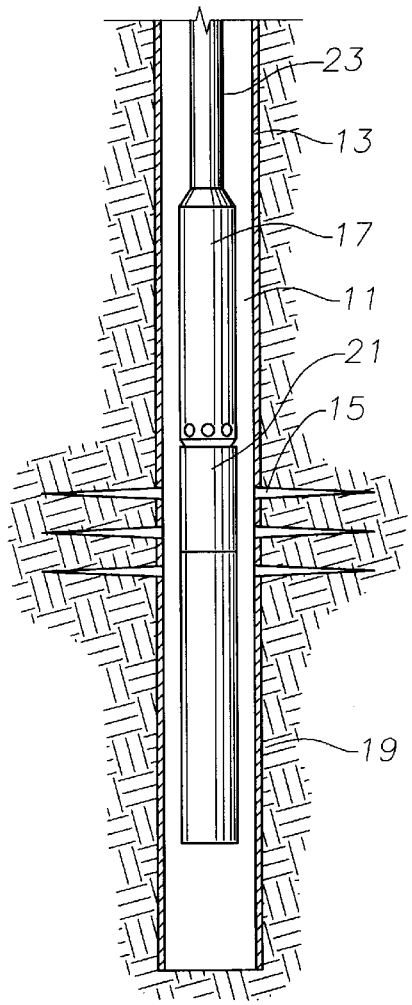
FIG. 1 is a schematic view illustrating an electrical submersible pump installed within a well.

Referring to FIG. 1, an electrical submersible pump assembly 11 is shown installed within a cased well 13. Perforations 15 supply fluid from a formation to well 13. Pump assembly 11 includes a centrifugal pump 17 of a conventional nature, having a large number of stages of impellers and diffusers. An electrical motor 19 is supplied with electrical power from the surface for driving pump 17. A seal section 21 is located between pump 17 and motor 19. Seal section 21 contains thrust bearings for absorbing thrust from pump 17. Seal section 21 also reduces pressure differential between lubricant in motor 19 and the pressure of the fluid in the well. Pump assembly 11 is supported on a string of production tubing 23 through which the produced fluids flow.

Figure 2:
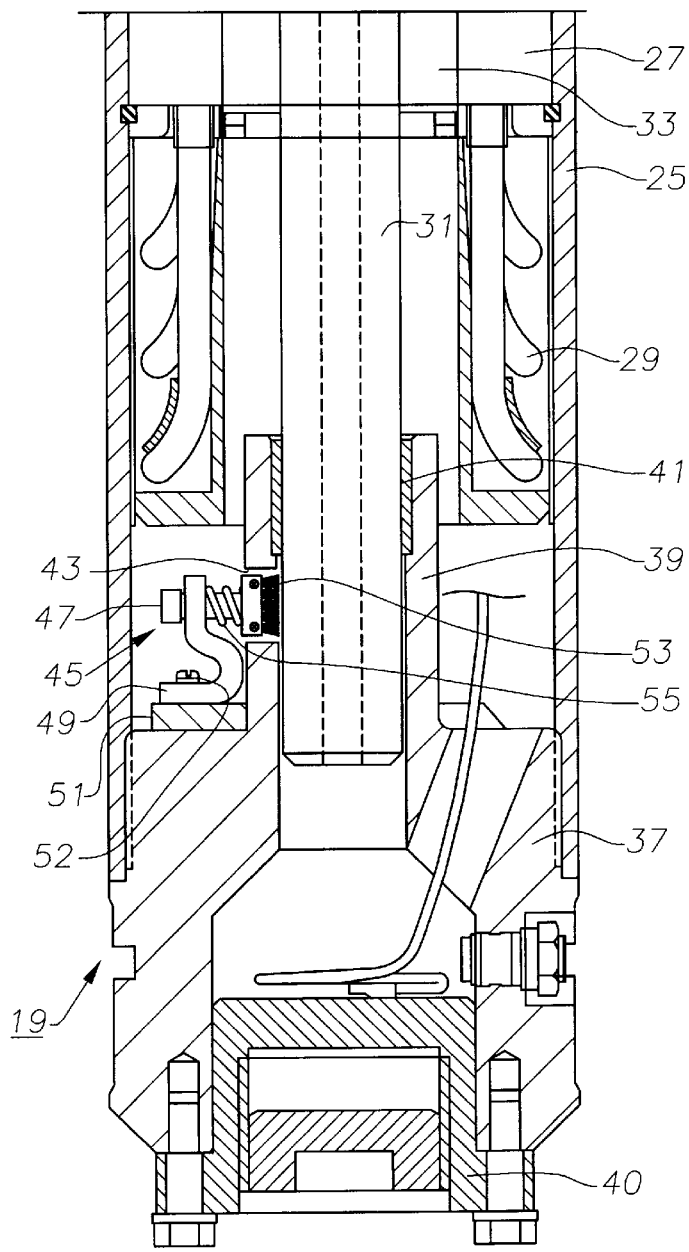
FIG. 2 is a sectional view illustrating a portion of an electrical motor for the submersible pump of FIG. 1, and showing a brush assembly installed in accordance with this invention.

Referring to FIG. 2, a lower portion of electrical motor 19 includes a cylindrical housing 25. A stator 27 is conventionally mounted in housing 25. Stator 27 is made up of a large number of discs through which windings 29 of wire are placed. Stator 27 is stationarily carried in housing 25 and electrically connected to a power cable (not shown) which extends to the surface.

A shaft 31 extends longitudinally through housing 25. Shaft 31 has a rotor 33 mounted to it for rotation therewith. Rotor 33 also comprises a large number of discs stacked together. AC power supplied to stator 27 will cause rotor 33 to rotate. A base 37 is located at the bottom of housing 25. Base 37 has an upward protruding neck or sleeve 39 and a lower end which serves as an adapter to mount another component to motor 19, such as a pressure transducer (not shown). A plug 40 is shown connected to the lower end of base 37. A base bushing or bearing 41 is located within neck 39 for radially supporting the lower end of shaft 31.

In the embodiment of FIG. 2, a number of additional bearings (not shown) are also contained in motor 19. These bearings include a thrust bearing which is located at the upper end of shaft 31 at the head of the motor for rotatably supporting the weight of shaft 31 and rotor 33. There are also a number of radial support bearings which radially support rotor 33 within stator 27.

A brush assembly 45 is mounted within housing 25 for reducing potential difference between shaft 31 and the stationary components of motor 19, including housing 25 and base 37. Brush assembly 45 is mounted in an annular area surrounding neck 39 adjacent a hole 43 provided in the sidewall of neck 39. Brush assembly 45 includes a holder rod 47 which is mounted perpendicular to the axis of rotor 33. Holder rod 47 is held in this position by a bracket 49. Bracket 49 has a lower portion which is mounted by a fastener 52 to base 37. A spacer 51 may be located between bracket 49 and base 37. Holder rod 47 is able to move radially relative to bracket 49. A coiled spring 55 encircles holder rod 47 and urges it inward toward shaft 31. A plurality of brush wires 53 are located at the inner end of holder rod 47. Brush wires 53 slidingly engage shaft 31. Motor 19 is filled with a lubricating oil which is a dielectric and which immerses brush assembly 45.

In the operation of the embodiment of FIG. 2, the magnetic field generated by the AC power supplied to stator 27 causes rotor 33 and shaft 31 to rotate. A voltage is induced into shaft 31 by the magnetic field. Brush wires 53 maintain shaft 31 in electrical common with base 37, and thus also stator 27 and housing 25. The grounding of these components occurs by the metal-to-metal contact between brush wires 53 and metal holder rod 47 and the metal-to-metal contact between holder rod 47 and bracket 49, which in turn is grounded to base 37. This prevents any voltage induced into shaft 31 from building up to a level which might cause arcing across any of the bearings.

Figure 3:
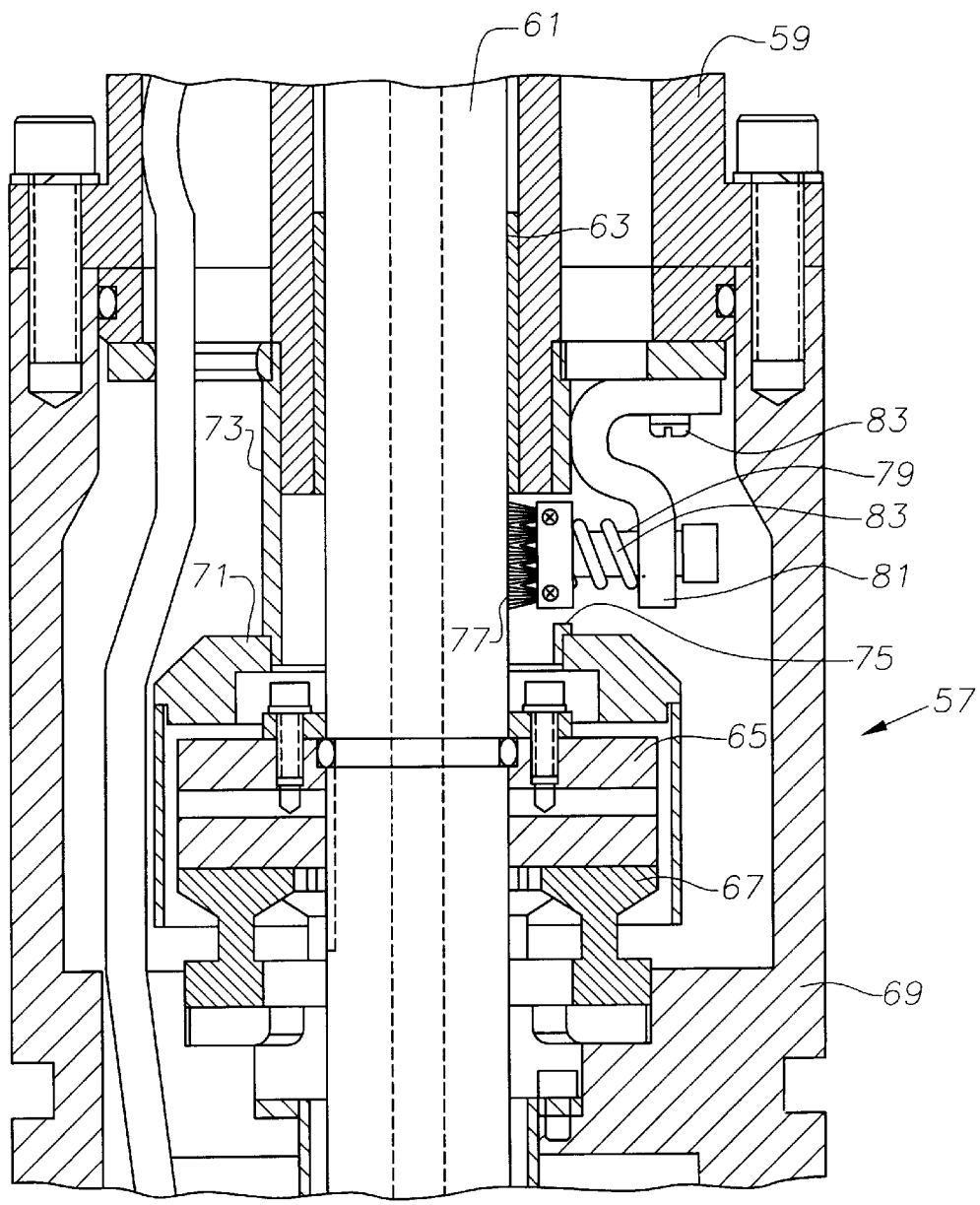
FIG. 3 is a sectional view illustrating a portion of another electrical motor for a submersible pump, and showing a brush assembly as in FIG. 1 installed in the motor.

Referring to FIG. 3, the same general type of brush assembly may be employed at an upper end of a motor, rather than a lower end as shown in FIG. 2. In FIG. 3, motor 57 is a lower portion of a tandem motor; that is, it is the lower one of two motors mounted together and driven in unison. Motor 57 has a head 59 on its upper end which is shown only partially. Head 59 serves as an adapter to mount motor 57 to an upper tandem motor. A shaft 61 extends through motor 57. Shaft 61 is supported radially by a bushing 63 which is mounted within a portion of head 59.

A thrust bearing assembly for rotatably supporting the weight of shaft 61 is shown in FIG. 3. The thrust bearing assembly is conventional and includes a runner 65 which rotates in unison with shaft 61. Runner 65 engages pads 67 which are mounted stationarily to motor housing 69. An enclosure 71 extends downward over runner 65. Enclosure 71 is supported by a sleeve 73 depending from a lower end of motor head 59. Sleeve 73 has a hole 75 within its sidewall which exposes a portion of shaft 61.

The brush assembly of FIG. 3 is the same as in FIG. 1. It includes a wire brush 77 which is in physical sliding engagement with shaft 61. Brush 77 is mounted to the inner end of a metal holder rod 79. Holder rod 79 is carried in a bracket 81, but is allowed to move in radial directions. Bracket 81 is mounted by a fastener 83 to head 59 in an annular area surrounding sleeve 73. A coiled spring 85 urges holder rod 79 inward toward shaft 61. Wire brush 77 is in electrical common with housing 69 by way of the metal-to-metal engagements of holder rod 79 and bracket 81. This places shaft 61 in electrical common with housing 69, and thus the stationary pads 67 of the thrust bearing. As in FIG. 1, motor 57 will be filled with a dielectric lubricating oil. Brush 77 will be immersed in the oil. Brush 77 will operate in the same manner as brush assembly 45 of FIG. 2.

The invention has significant advantages. The brush assembly reduces the tendency for arcing across bearings, which can damage or destroy the bearings. The brush assembly is readily installed and is inexpensive.

While the invention has been shown in only two of its forms, it should be apparent to those skilled in the art that it is not so limited but is susceptible to various changes without departing from the scope of the invention. For example, other types of brushes may be employed rather than one having metal wires, including solid metal brushes. Brush assemblies may be located both at the top and the bottom of a motor if needed.

We claim:

1. In a submersible well pump assembly having a multistage pump driven by an electrical motor having a housing, a shaft mounted on bearings in the housing, a stator stationarily mounted in the housing, a rotor mounted to the shaft for rotation therewith and extending through the stator, the housing being filled with a dielectric liquid, the improvement comprising:

an electrical brush assembly stationarily carried by and in electrical common with the housing, the brush assembly having a brush member of conductive material in sliding engagement with the shaft, the brush assembly being immersed in the dielectric lubricant.

2. The pump assembly according to claim 1, wherein the brush assembly comprises:

a holder to which the brush member is mounted;

a bracket which is carried by the housing and supports the holder adjacent to the shaft; and wherein the holder and the bracket are of a conductive material for grounding the brush member to the housing.

3. The pump assembly according to claim 1, wherein the brush assembly comprises:

a holder which supports the brush member;

a bracket which is carried by the housing and supports the holder adjacent to the shaft for transverse movement relative to the shaft;

a spring mounted to the holder which urges the brush member into contact with the shaft; and wherein the holder and the bracket are of a conductive material for grounding the brush member to the housing.

4. The pump assembly according to claim 1, wherein the brush comprises a plurality of electrically conductive members extending into contact with the shaft.

5. The pump assembly according to claim 1, wherein the motor has an axis and a base spaced axially from the stator and the rotor; and wherein the brush assembly is mounted to the base and spaced axially from the stator and the rotor.

6. The pump assembly according to claim 1, wherein the motor has a head at an upper end above the stator and the rotor; and wherein the brush assembly is mounted to the head above the stator and the rotor.

7. An electrical motor for a submersible centrifugal pump, comprising:

a housing having an axis and filled with a dielectric lubricant;

an end adapter located at each end of the housing for connecting the motor to another component;

a stator stationarily mounted in the housing between the end adapters;

a shaft supported in the housing by bearings;

a rotor mounted to the shaft for rotation therewith and extending through the stator; and a brush assembly stationarily mounted in the housing to one of the end adapters and immersed in the lubricant, the brush assembly having an electrically conductive brush member in sliding engagement with the shaft, the brush member being in electrical common with said one of the end adapters to reduce the tendency for arcing across the bearings due to a potential difference between the shaft and the stator.

8. The motor according to claim 7, wherein said one of the end adapters is a head axially spaced from the stator; and wherein the brush assembly is mounted in a space between the head and the stator.

9. The motor according to claim 7, wherein said one of the end adapters is a base axially spaced from the stator; and wherein the brush assembly is mounted in a space between the head and the stator.

10. The motor according to claim 7, wherein:

said one of the end adapters has a sleeve which surrounds a portion of the shaft;

the sleeve has a sidewall containing an aperture formed therein; and wherein the brush member extends through the aperture in the sleeve into contact with the shaft.

11. The motor according to claim 7, wherein the brush assembly comprises:

a holder to which the brush member is mounted;

a bracket which is mounted to said one of the end adapters and supports the holder adjacent to the shaft; and wherein the holder and the bracket are of a conductive material for grounding the brush member to the adapter.

12. The motor according to claim 7, wherein the brush assembly comprises:
   a holder which supports the brush member;
   a bracket which is mounted to said one of the end adapters and supports the holder adjacent to the shaft for radial movement relative to the axis;
   a spring mounted to the holder which urges the brush member into contact with the shaft; and
   wherein the holder and the bracket are of a conductive material for grounding the brush member to the housing.

13. The motor according to claim 7, wherein the brush member comprises a plurality of electrically conductive members extending into contact with the shaft.

14. An electrical motor for a submersible centrifugal pump, comprising:
   a housing filled with a dielectric lubricant;
   an end member located at each end of the housing;
   a stator stationarily mounted in the housing, the stator having a length less than the housing, defining an upper end space within the housing above the stator and a lower end space within the housing below the stator;
   a shaft supported in the housing by bearings;
   a rotor mounted to the shaft for rotation therewith and extending through the stator;
   a sleeve surrounding a portion of the shaft within one of the end spaces, the sleeve having a sidewall with an outer diameter smaller than an inner diameter of the housing, defining an annular area within said one of the end spaces;
   an aperture extending through the sleeve, exposing a portion of the shaft to the annular area; and
   a brush assembly stationarily mounted in the housing within the annular area and immersed in the lubricant, the brush assembly having an electrically conductive brush member extending through the aperture in sliding engagement with the shaft, the brush member being in electrical common with the housing to reduce the tendency for arcing across the bearings due to a potential difference between the shaft and the stator.

15. The motor according to claim 14 wherein the brush assembly is located at an upper end of the motor.

16. The motor according to claim 14 wherein the brush assembly is located at a lower end of the motor.

17. The motor according to claim 14, wherein the brush assembly comprises:
   a holder to which the brush member is mounted;
   a bracket which is carried by the housing and supports the holder adjacent to the shaft; and
   wherein the holder and the bracket are of a conductive material for grounding the brush member to the housing.

18. The motor according to claim 14, wherein the brush assembly comprises:
   a holder which supports the brush member;
   a bracket which is carried by the housing and supports the holder adjacent to the shaft for radial movement relative to an axis of the shaft;
   a spring mounted to the holder which urges the brush member into contact with the shaft; and
   wherein the holder and the bracket are of a conductive material for grounding the brush member to the housing.

19. The motor according to claim 14, wherein the brush member comprises a plurality of electrically conductive members extending into contact with the shaft.

20. An electrical motor for a submersible centrifugal pump, comprising:
   a housing having an axis and filled with a dielectric lubricant;
   an end adapter located at each end of the housing for connecting the motor to another component;
   a stator stationarily mounted in the housing between the end adapters;
   a shaft supported in the housing by bearings;
   a rotor mounted to the shaft for rotation therewith and extending through the stator; and
   a brush assembly stationarily mounted in the housing to one of the end adapters and immersed in the lubricant, the brush assembly having an electrically conductive brush member in sliding engagement with the shaft, the brush member being in electrical common with said one of the end adapters to reduce the tendency for arcing across the bearings due to a potential difference between the shaft and the stator, said one of the end adapters having a protruding sleeve through which said shaft extends, said sleeve having an aperture formed therein for receiving said brush member.

21. The motor according to claim 20, wherein:
   said one of the end adapters is a head spaced above the stator.

22. The motor according to claim 20, wherein:
   said one of the end adapters is a base spaced below the stator.

23. The motor according to claim 20, wherein the brush assembly comprises:
   a holder to which the brush member is mounted;
   a bracket which is mounted to said one of the end adapters and supports the holder adjacent to the shaft; and
   wherein the holder and the bracket are of a conductive material for grounding the brush member to said one of the end adapters.

24. The motor according to claim 20, wherein the brush assembly comprises:
   a holder which supports the brush member;
   a bracket which is mounted to said one of the end adapters and supports the holder adjacent to the shaft for radial movement relative to the axis;
   a spring mounted to the holder which urges the brush member into contact with the shaft; and
   wherein the holder and the bracket are of a conductive material for grounding the brush member to the housing.

25. The motor according to claim 20, wherein the brush member comprises a plurality of electrically conductive members extending into contact with the shaft.

26. An electrical motor for a submersible centrifugal pump, comprising:
   a housing filled with a dielectric lubricant;
   an end member located at each end of the housing;
   a stator stationarily mounted in the housing, the stator having a length less than the housing, defining an upper end space within the housing above the stator and a lower end space within the housing below the stator;
   a shaft supported in the housing by bearings;
   a rotor mounted to the shaft for rotation therewith and extending through the stator;
   a sleeve attached to one of the end members and surrounding a portion of the shaft within one of the end spaces, the sleeve having a sidewall with an outer diameter smaller than an inner diameter of the housing, defining an annular area within said one of the end spaces;

an aperture extending through the sleeve, exposing a portion of the shaft to the annular area; and a brush assembly stationarily mounted in the housing within the annular area and immersed in the lubricant, the brush assembly having an electrically conductive brush member extending through the aperture in sliding engagement with the shaft, the brush member being in electrical common with the housing to reduce the tendency for arcing across the bearings due to a potential difference between the shaft and the stator.

27. The motor according to claim 26 wherein the brush assembly is located at an upper end of the motor.

28. The motor according to claim 26 wherein the brush assembly is located at a lower end of the motor.

29. The motor according to claim 26, wherein the brush assembly comprises:

a holder to which the brush member is mounted;

a bracket which is carried by the housing and supports the holder adjacent to the shaft; and wherein the holder and the bracket are of a conductive material for grounding the brush member to the housing.

30. The motor according to claim 26, wherein the brush assembly comprises:

a holder which supports the brush member;

a bracket which is carried by the housing and supports the holder adjacent to the shaft for radial movement relative to an axis of the shaft;

a spring mounted to the holder which urges the brush member into contact with the shaft; and wherein the holder and the bracket are of a conductive material for grounding the brush member to the housing.

31. The motor according to claim 26, wherein the brush member comprises a plurality of electrically conductive members extending into contact with the shaft.

* * * * *